United States Patent
Chanda (10) Patent No.: US 9,864,784 B1
(45) Date of Patent: Jan. 9, 2018

(54) SEARCH QUERY CLASSIFICATION

(71) Applicant: Amazon Technologies, Inc., Seattle, WA (US)

(72) Inventor: Gaurav Chanda, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 296 days.

(21) Appl. No.: 14/629,570

(22) Filed: Feb. 24, 2015

(51) Int. Cl.
*G06F 17/30* (2006.01)

(52) U.S. Cl.
CPC .... *G06F 17/3053* (2013.01); *G06F 17/30864* (2013.01)

(58) Field of Classification Search
CPC .............. G06F 17/3053; G06F 17/30864
See application file for complete search history.

(56) References Cited

U.S. PATENT DOCUMENTS

| 8,145,623 B1* | 3/2012 | Mehta | G06F 17/3064 707/713 |
| 8,838,587 B1* | 9/2014 | Adams | G06F 17/30867 707/722 |
| 2009/0276419 A1* | 11/2009 | Jones | G06F 17/30637 |
| 2013/0036114 A1* | 2/2013 | Wong | G06F 17/30861 707/732 |
| 2014/0351236 A1* | 11/2014 | Zhu | G06F 17/30864 707/709 |
| 2014/0372351 A1* | 12/2014 | Sun | G06N 99/005 706/12 |

* cited by examiner

*Primary Examiner* — Jorge A Casanova
(74) *Attorney, Agent, or Firm* — Thomas Horstemeyer, LLP (57) ABSTRACT

Disclosed are various embodiments for classifying search queries. A computing device identifies a user account associated with a submission of a search query to an electronic commerce application. The computing device then identifies a network page provided by the electronic commerce application, wherein the network page is requested with the user account. Subsequently, the computing device classifies the search query based at least in part on the requested network page.

20 Claims, 5 Drawing Sheets

SEARCH QUERY CLASSIFICATION

BACKGROUND

Electronic commerce systems may provide search functionality for users to search for products or items available for sale from an electronic catalog of the electronic commerce system. This search functionality may, for example, allow for users to submit search queries. Users may also be able to further sort or otherwise refine the search results that are returned.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for classifying search queries. Network pages, such as web pages provided by electronic commerce applications, may provide a search bar, field, or similar user interface element to assist in searching for items in a product catalog. Search queries entered in the search bar may cause a list of matching products or items to be returned by the electronic commerce application. However, users may also wish to find network pages of the electronic commerce application that are unrelated to products, such as a help or customer service network page, a network page with company contact information, a network page for managing a user account, and/or similar non-product related network pages. In such instances, users may submit a search query via the search bar to find the non-product related network page for which the user is searching.

In order to provide accurate search results, search queries may be classified as product search queries, non-product search queries, help search queries, and/or classified as other types of search queries. The search results provided in response to the search query may be based at least in part on the type or classification of the submitted search query. In the following discussion, a general description of the system and its components is provided, followed by a discussion of the operation of the same.

Figure 1:
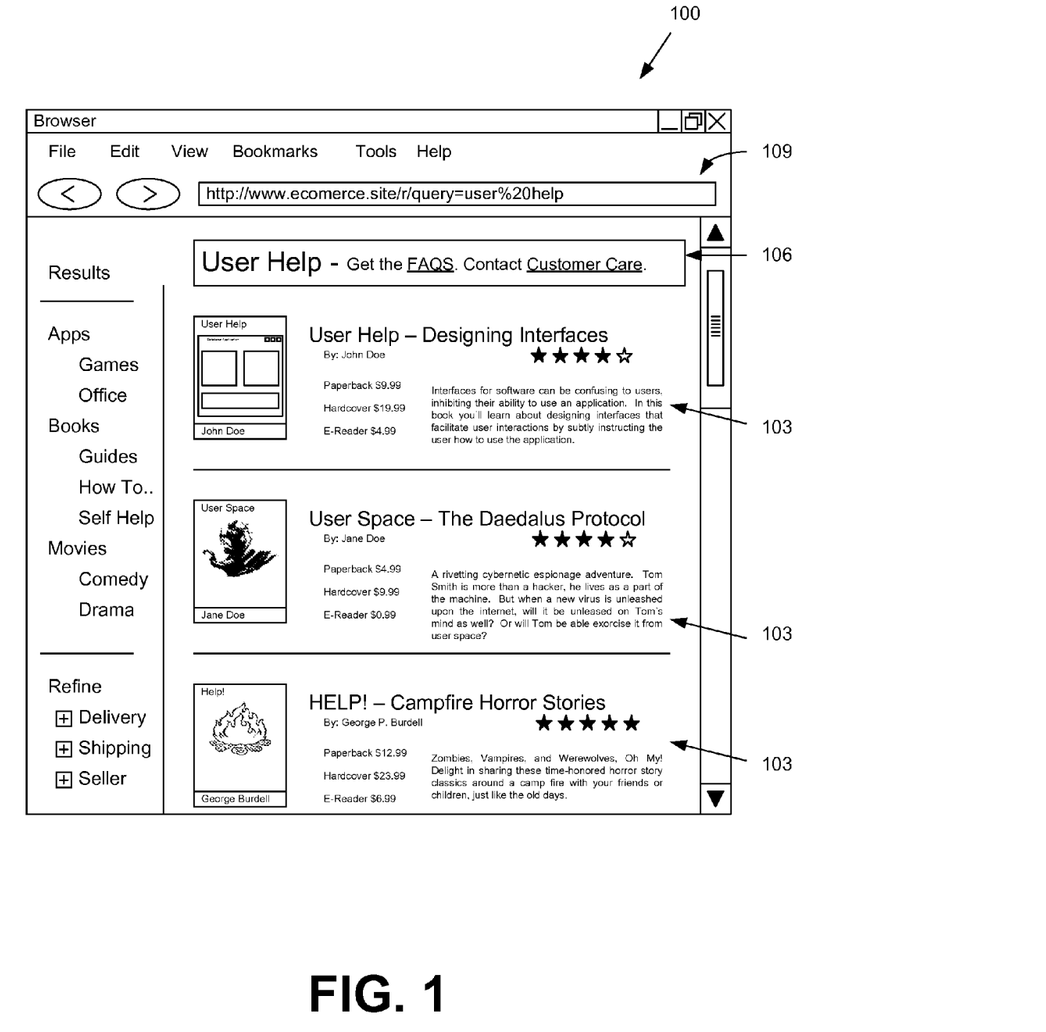
FIG. 1 is an illustration of one of several embodiments of the present disclosure.

Beginning with FIG. 1, shown is a user interface 100, such as a browser window or other interface. Within the user interface 100 are displayed a number of search results 103 rendered in response to submission of a search query. Also depicted in the user interface 100 is a suggested search result 106. The suggested search result 106 may be included in the response to a search query if the search query has been determined to be a search query associated with attempts to find specific content, such as the help section of a network site, instead of a generic search query or a default search query, such as a product search query submitted to an electronic commerce application.

As illustrated, a search query of "user help" has been previously submitted. The submitted search query, in some embodiments, may be depicted in an address bar 109, as shown. In response, a number of search results 103 for products or items available for purchase that match the search query "user help" have been returned. However, search query "user help" may have been previously classified as a non-product search query, such as a help search query. Therefore, a suggested search result 106 directing a user to the user help section of the electronic commerce application is included with the search results 103 in case the user was looking for the user help section of the electronic commerce application instead of search of products that matched the search query "user help."

Figure 2:
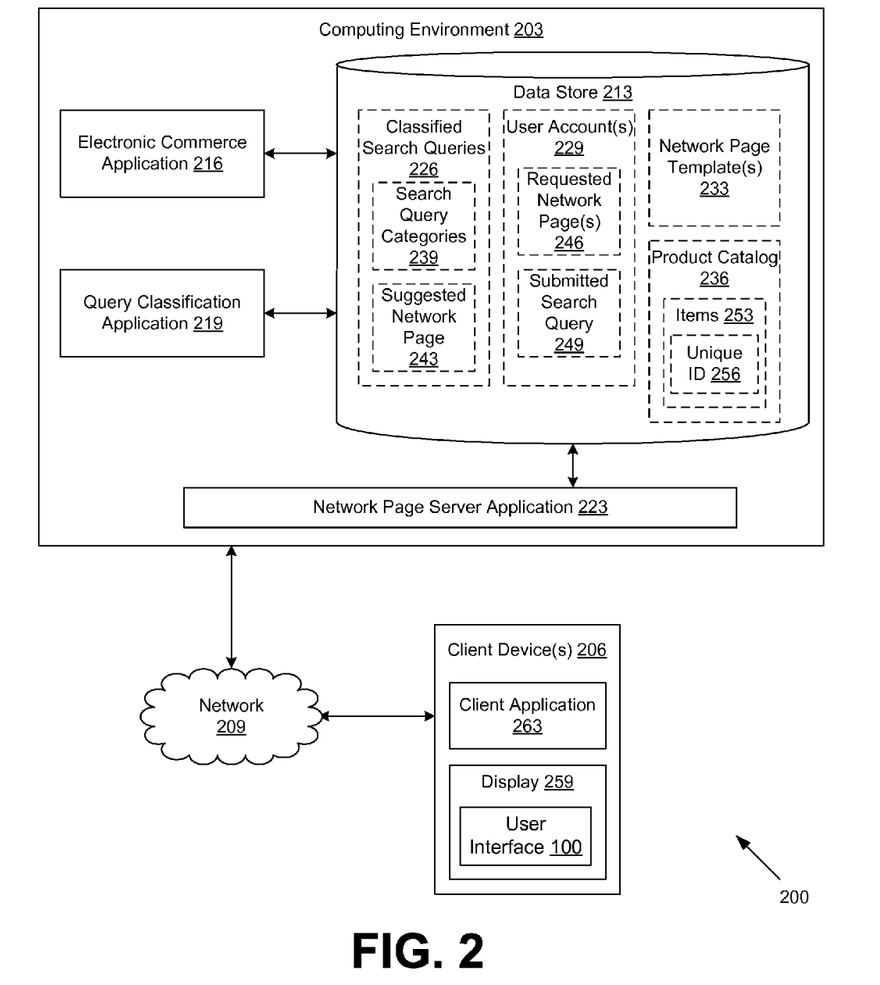
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 213 that is accessible to the computing environment 203. The data store 213 may be representative of a plurality of data stores 213 as can be appreciated. The data stored in the data store 213, for example, is associated with the operation of the various applications and/or functional entities described below.

The components executed on the computing environment 203, for example, include an electronic commerce application 216, a query classification application 219, a network page server application 223, and other applications, services, processes, systems, engines, or functionality not discussed in detail herein. The electronic commerce application 216 is executed in order to facilitate online purchases of items over the network 209. The electronic commerce application 216 may generate network pages, such as web pages, that provide descriptions of items and allow for purchase of the item. The electronic commerce application 216 may also provide search functionality, such as a tool bar, text input field, filters, and/or other user interface elements, that facilitate searching a product catalog for one or more items. The electronic commerce application 216 may also perform various backend functions associated with the online presence of a merchant in order to facilitate the online purchase of items as will be described. The query classification 219 is executed to classify search queries received from client devices 206, as will be further described herein. The network page server application 223 is executed to dynamically generate network pages on behalf of the electronic commerce application 216, as will be further described herein.

The data stored in the data store 213 includes, for example, classified search queries 226, user accounts 229, network page templates 233, a product catalog 236, and potentially other data. The individual ones of the classified search queries 226 may correspond to one or more search query categories 239 and one or more suggested network pages 243. A user account 229 may include one or more requested network pages 246 requested with the user account 229 and a submitted search query 249 submitted to the electronic commerce application 216 with the user account 229. The product catalog may include one or more items 253 for sale through the electronic commerce application 216.

The classified search queries 226 represent the set of search queries that have been previously submitted to the electronic commerce application 216 and have been classified by the query classification application 219 as belonging to one or more search query categories 239. Each classified search query 226 may be associated with one or more search query categories 239 and with a suggested network page 243.

Search query categories 239 represent a type, classification, or other taxonomy for search queries. Examples of search query categories 239 may include product search queries, which may represent search queries associated with searches of the product catalog 236, and non-product search queries, which may represent search queries for information not contained in the product catalog 236. Non-product search queries may, for example, include searches for customer service information, user account management information, company contact information, and help with using various aspects of the electronic commerce application 216 in general. In some embodiments, a classified search query 226 may be assigned to multiple search query categories 239.

A suggested network page 243 represents a network page or an address for a network page that is likely to be the intended destination of a user of the electronic commerce application 216. For example, a user submitting a non-product search query may intend to find the help page of the electronic commerce application 216 and not network pages of products that match the search term "help." Therefore, the suggested network page 243 for the non-product search query may represent the help page of the electronic commerce application 216. In various embodiments, a classified search query 226 may include multiple suggested network pages 243.

The user accounts 229 may include data or attributes associated with the account of a user of the electronic commerce application 216. Such data or attributes may include, for example, the name, address, phone number, email address, employer, occupation or profession, purchase or order history, demographic data, or other data of the user. Such data or attributes may also include authorization data such as user name, password, personal identification number (PIN), or other similar data. User accounts 229 may also include data for tracking interactions of a user with the electronic commerce application 216, such as any requested network pages 246 and/or a submitted search query 249.

A requested network page 246 represents a request for a network page submitted to the electronic commerce application 216 with the user account 229. This may include the address of the requested network page 246, as represented by a uniform resource locator (URL) or other identifier. This may also include the time that the request was made and data regarding how the requested network page 246 was reached. For example, this may include data indicating that the requested network page 246 was reached from a link located on a previously visited network page, such as a search results page, and the address of the previously visited network page, as represented by a URL for the previously visited network page.

A submitted search query 249 represents a search query submitted to the electronic commerce application 216 with the user account 229. This may include the text of the submitted search query 249, the time that the submitted search query 249 was received by the electronic commerce application 216, the time that the submitted search query 249 was sent from a client device 206, and/or potentially other data.

A network page template 233 represents data specifying the layout and content of a network page generated by the network page server application 223. A network page template 223 may, for example, specify where information for individual items 253 is to be placed in a network page generated by the network page server application 223 or where search results generated by the electronic commerce application 216 are to be located in the network page generated by the network page server application 223. The network page template 223 may also specify a theme, style, color scheme, font, and/or details of the network page generated by the network page server application 223.

A product catalog 236 represents a schema, taxonomy, directory, or other organizational scheme for items 253 available for purchase via the electronic commerce application 216. Items 253 may include goods, services, digital or electronic media, and similar products or merchandise available for purchases through the electronic commerce application 216. Each item 253 has a unique identifier 256 which uniquely identifies the item 253 from other items 253 listed in the product catalog 236. The unique identifier 256 may be a catalog or index number, a Universal Product Code ("UPC") number, or similar uniquely identifying code, number, symbol, or attribute.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 259. The display 259 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 263 and/or other applications. The client application 263 may be executed in a client device 206, for example, to access network content served up by the computing environment 203 and/or other servers, thereby rendering a user interface 100 on the display 259. To this end, the client application 263 may comprise, for example, a browser, a dedicated application, etc., and the user interface 100 may comprise a network page, an application screen, etc. The client device 206 may be configured to execute applications beyond the client application 263 such as, for example, email applications, social networking applications, word processors, spreadsheets, and/or other applications.

Next, a general description of the operation of the various components of the networked environment 200 is provided. To begin, one or more search queries and one or more requests for network pages are received by the electronic commerce application 216 from a client application 263 associated with a user account 229. Each search query received is stored by the electronic commerce application 216 as a submitted search query 249 of the user account 229 and each request for a network page is stored by the electronic commerce application 216 as a requested network page 246 of the user account 229.

For each submitted search query 249, the electronic commerce application 216 compares the submitted search query 249 with each of the classified search queries 226 to determine whether the submitted search query 249 matches one of the classified search queries 226. If the submitted search query 249 matches one of the classified search queries 226, then the electronic commerce application 216 retrieves the search query categories 239 and suggested network pages 243 of the matching classified search query 226 and supplies them to the network page server application 223. The network page server application 223 then uses the search query categories 239 and the suggested network pages 243 to select an appropriate network page template 233. The network page server application 223 then generates and returns a network page to the client application 263.

However, if the submitted search query 249 does not match a classified search query 226, then the electronic commerce application 216 searches the product catalog 236 for one or more items 253 that match one or more terms in the submitted search query 249. The electronic commerce application 216 supplies the list of matching items 253 to the network page server application 223, which generates a network page that includes information about the items 253 in the manner specified by another network page template 233.

Concurrent with the process described above, the query classification application 219 analyzes the submitted search query 249 for classification. The query classification application 219 may, for example, track the number of times that the electronic commerce application 216 has received the submitted search query 249, either from a single user account 229 or from multiple user accounts 229. The query classification application 219 may also track, for example, the number of times that users have navigated to a particular requested network page 246 after the electronic commerce application 216 has received the submitted search query 249. If users have navigated to a particular network page 246 after the electronic commerce application 216 has received the submitted search query 249 more often than expected, then the electronic commerce application 216 may add the submitted search query 249 to the set of classified search queries 226 by setting the suggested network page 243 to the particular requested network page 246 that is visited more frequently than expected and by assigning a search query category 239 based upon the type of the particular requested network page 246 that has been visited more often than expected.

For example, a user may submit a search query of "user help." The user may then be presented with a network page containing a listing of items 253 that match one or more of the search terms in the "user help" query. However, if a user is more interested in finding the help section provided by the electronic commerce application 216, such as a help page, the user may then search for and follow a link to the help page instead of following a link to a network page for one of the items 253. If a greater than expected or predicted number of users follow the link to the help page after submitting the query "user help," then the query classification application 219 may determine that the query "user help" is not a product search query, but is a non-product search query, such as a query intended to lead a user to the help page. The query classification application 219 may subsequently include the search query in the list of classified search queries 226 and set the values for the search query category 239 and the suggested network page 243 accordingly.

Figure 3:
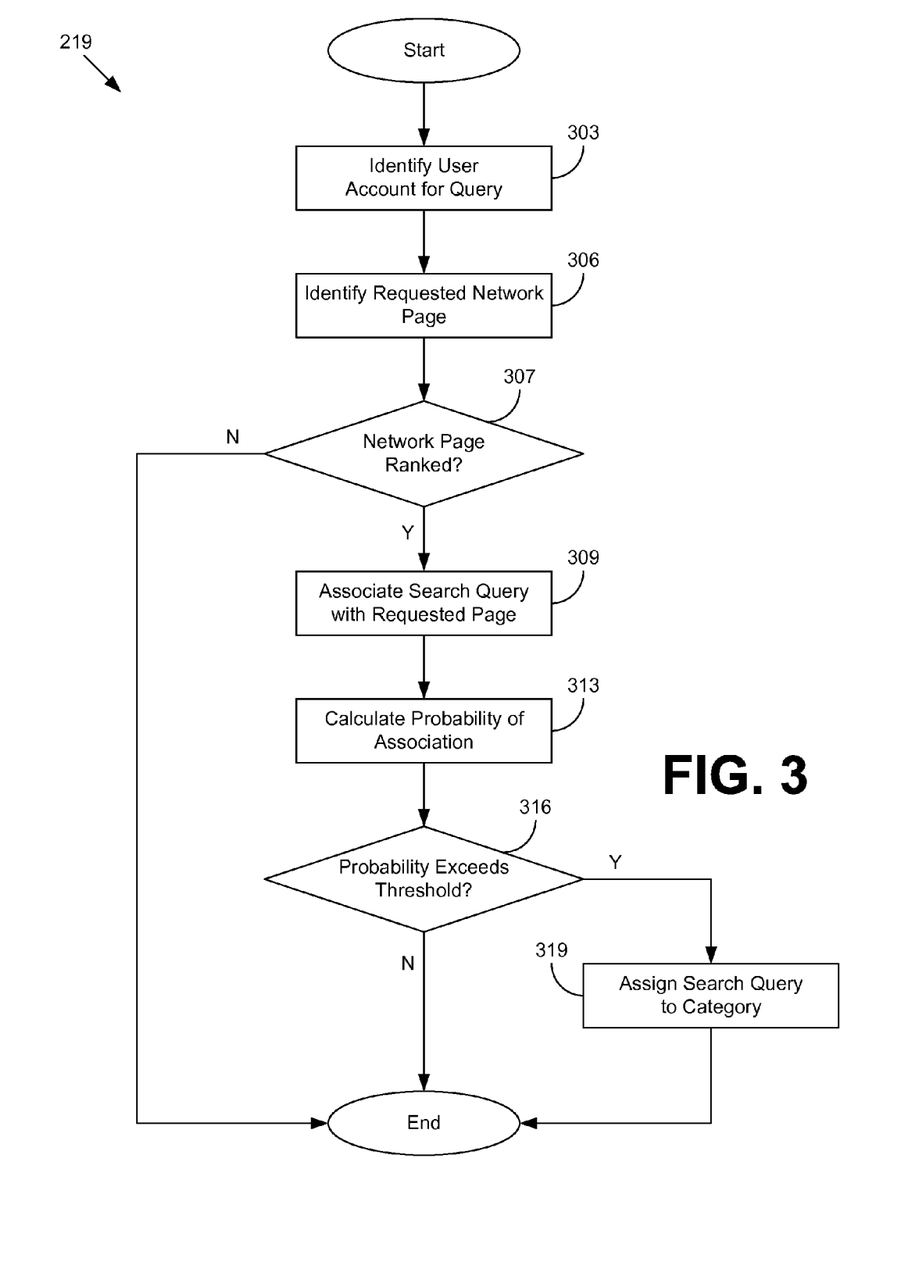
FIG. 3 is a flowchart illustrating one example of functionality implemented as portions of an application executed in a computing environment in the networked environment of FIG. 2 according to various embodiments of the present disclosure.

Moving next to FIG. 3, shown is a flowchart that provides one example of the operation of a portion of the query classification application 219 according to various embodiments. It is understood that the flowchart of FIG. 3 provides merely an example of the many different types of functional arrangements that may be employed to implement the operation of the portion of the query classification application 219 as described herein. As an alternative, the flowchart of FIG. 3 may be viewed as depicting an example of elements of a method implemented in the computing environment 203 (FIG. 2) according to one or more embodiments.

Beginning with box 303, the query classification application 219 identifies a user account 229 (FIG. 2) associated with a submitted search query 249 (FIG. 2) received from a client application 263 (FIG. 2), such as a browser or other application. The query classification application 219 may identify the user account 229, for example, by checking for a cookie, session identifier, or similar identification token included with the submitted search query 249. If a user is not logged in, however, the user account 229 may be identified through other means, such as by internet protocol (IP) address or a browser fingerprint based upon a unique combination of browser plugins, system fonts, HTTP_ACCEPT headers, user agent, and other information reported by the browser executing on the client device 206 (FIG. 2) of the user. By identifying a user account 229 to associate with a submitted search query 249, the search behavior of individual users may be tracked so that the submitted search query may be accurately classified, as will be discussed in further detail herein.

Moving on to box 306, the query classification application 219 identifies a requested network page 246 (FIG. 2) associated with the user account 229. The requested network page 246 may be identified, for example, by analyzing requests for network pages sent to the electronic commerce application and/or network page server application 223 (FIG. 2). In some embodiments, the query classification application 219 may limit itself to identifying only requested network pages 246 that were requested after the submitted search query 249 was received. Such behavior may indicate that a user is actively searching for the requested network page 246 by using the submitted search query 249.

Referring next to box 307, the query classification application 219 may determine whether the requested network page 246 is a ranked higher than a predefined threshold. For any submitted search query 249, links to a number of network pages may provided in response. These links to network pages may be sorted and ranked, for example, according to relevancy, popularity, or some other metric, where links to more relevant or popular network pages are provided first. By determining whether a requested network page 246 is ranked prior to classifying the submitted search query 249 improper or incorrect classifications of the submitted search query 249 may be minimized. If the requested network page 246 is ranked higher than the threshold, then execution proceeds to box 309. Otherwise, the previously described path of execution subsequently ends.

Proceeding next to box 309, the query classification application 219 associates the submitted search query 249 with the requested network page 246, strengthening the correlation between the submitted search query 249 and the requested network page 246. For example, the query classification application 219 may store a correlation between the submitted search query 249 and the requested network page 246 if the requested network page 246 is the first network page requested after the submitted search query 249 is received by the electronic commerce application 216. In some embodiments, the query classification application 219 may store a correlation between the submitted search query 249 and the requested network page 246 if the requested network page 246 is one of several network pages requested after the submitted search query 249 is received by the electronic commerce application 216. For example, the query classification application 219 may identify a correlation between one of the first two, three, four, five, or other threshold number of network pages requested after the submitted search query 249 is received by the electronic commerce application 216 and the submitted search query 249 itself. In other embodiments, the query classification application 219 may store a correlation between the submitted search query 249 and the requested network page 246 if the requested network page 246 is requested within a predefined period of time after the submitted search query 249 is received by the electronic commerce application 216.

Referring next to box 313, the query classification application 219 calculates the probability that the submitted search query 249 would lead the user to the requested network page 246 in comparison to other network pages. This probability may be represented, for example by the equation:

$$P = P(B|A) - P(B) \qquad (1)$$

where P(B|A) represents the observed probability that a user followed submitted search query 249 "A" to requested network page 246 "B" in comparison to those users arrived at requested network page 246 "B" independently. The resulting value "P" represents the association between the submitted search query 249 and the requested network page 246. Larger values of "P" may indicate that the submitted search query 249 is received from users who are actively searching for the requested network page 246. Other models, which may be used in various embodiments of the present disclosure, are disclosed in U.S. Pat. No. 8,239,287, entitled "System for Detecting Probabilistic Associations Between Items," granted Aug. 7, 2012, which is incorporated by reference in its entirety as if set forth fully herein.

Moving on to box 316, the query classification application 219 determines whether the calculated probability "P," as described in equation 1, exceeds a previously defined threshold value. The previously defined threshold value may be set based on empirical observations of user behavior. Generally, the threshold value will be one that is high enough that misclassifications will be avoided or minimized, but not so high as to cause valid classifications to be overlooked. If the calculated probability exceeds the previously defined threshold, then the previously described path of execution proceeds to box 319. Otherwise, the previously described path of execution subsequently ends.

Proceeding to box 319, the query classification application 219 assigns a search query category 239 to the submitted search query 249 and stores the requested network page 246 as a suggested network page 243 for the newly classified search query 226. The search query category 239 may be based at least in part on the requested network page 246. For example, if the requested network page 246 is for a particular portion or functionality of the electronic commerce application 216, such as a help section, an account management section, or other portion of the electronic commerce application 216, then a corresponding search query category 239, such as "help query," "account query," or a more general "non-product query" search query category 239 may be selected. The previously described path of execution subsequently ends.

Figure 4:
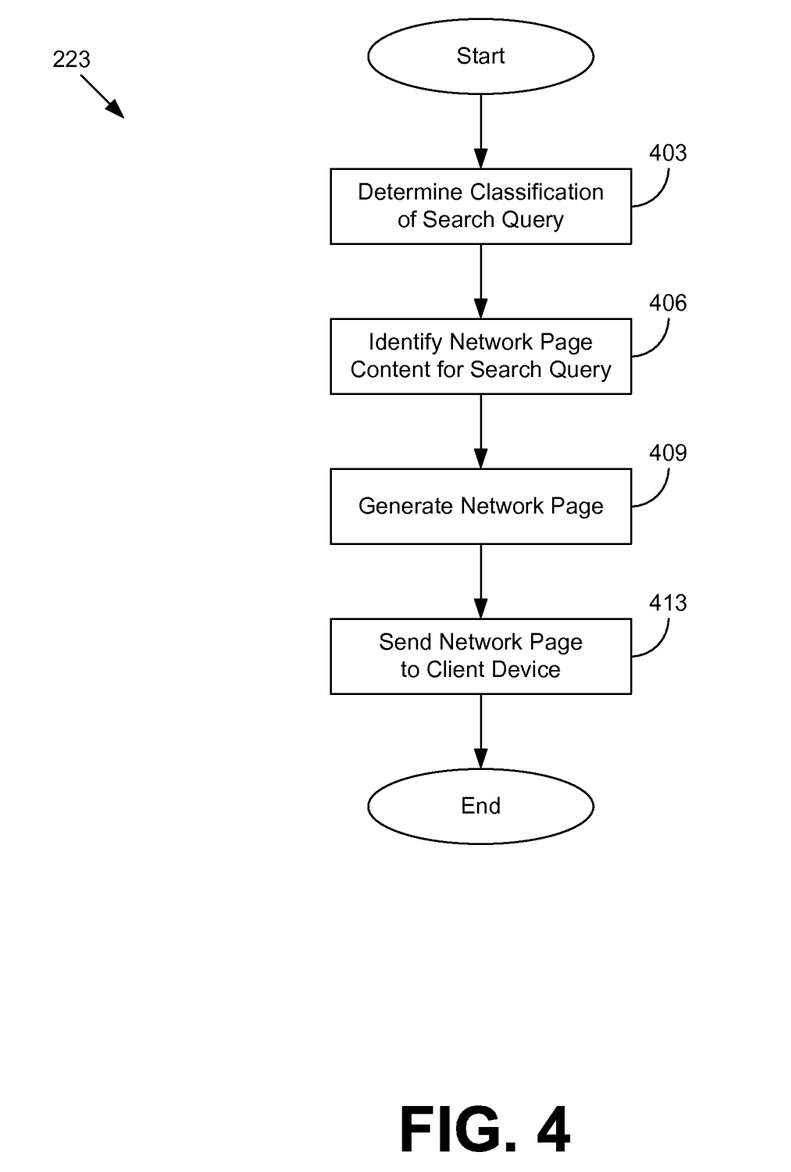
FIG. 4 is a flowchart illustrating one example of functionality implemented as portions of an application executed in a computing environment in the networked environment of FIG. 2 according to various embodiments of the present disclosure.

Turning now to FIG. 4, shown is a flowchart that provides one example of the operation of a portion of the network page server application 223 according to various embodiments. It is understood that the flowchart of FIG. 4 provides merely an example of the many different types of functional arrangements that may be employed to implement the operation of the portion of the network page server application 223 as described herein. As an alternative, the flowchart of FIG. 4 may be viewed as depicting an example of elements of a method implemented in the computing environment 203 (FIG. 2) according to one or more embodiments.

Beginning with box 403, network page server application 223 determines the classification of the search query category 239 (FIG. 2) of a submitted search query 249 (FIG. 2). The network page server application 223 may, for example, compare the submitted search query 249 with a list of classified search queries 226 (FIG. 2). If the submitted search query 249 matches one of the classified search queries 226, then the network page server application 223 uses the search query category 239 of the matching classified search query 226. If the submitted search query 249 does not match any of the classified search queries 226, then the network page server application 223 may use a default search query category 239. For example, in some embodiments, the default search query category 239 may correspond to a "product search query" or similar query type indicating that submitted search query 249 is a search query for items 253 (FIG. 2) in the product catalog 236 (FIG. 2).

Moving on to box 406, the network page server application 223 identifies content for network page responsive to the submitted search query 249. The content may be specified, for example, by a network page template 233 used to generate network pages. For example, the network page server application 223 may identify a network page template 233 based on the search query category 239 as previously determined. In other embodiments, the network page template 233 may specify that certain content be included in the generated network page based upon the search query category 239, as previously determined. In other embodiments, the network page server application 223 may use the suggested network page 243 for the response to the submitted search query 249 instead of generating a responsive network page according to the specifications of a network page template 233.

Proceeding next to box 409, the network page server application 223 generates a network page. In some embodiments, the network page server application 223 may simply use the suggested network page 243 associated with the search query category 239 as previously determined. In other embodiments, the network page server application 223 may dynamically generate a network page in the manner specified by the network page template 233.

Referring next to box 413, the network page server application 223 sends the generated network page to the client application 206. The network page may be sent, for example, using a version of the hypertext transfer protocol (HTTP) or similar data transfer protocol. The previously described path of execution subsequently ends.

Figure 5:
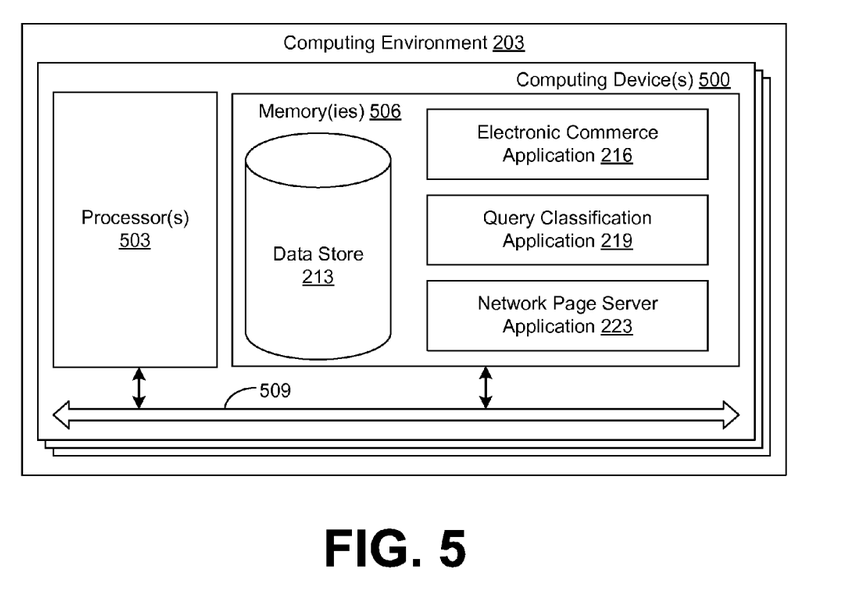
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce application 216, the query classification application 219, the network page server application 223, and potentially other applications. Also stored in the memory 506 may be a data store 213 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 216, the query classification application 219, the network page server application 223, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the query classification application 219 and the network page server application 223s. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 216, the query classification application 219, and the network page server application 223, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 216, the query classification application 219, and the network page server application 223, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing a program that, when executed by a processor of a computing device, causes the computing device to at least:
    identify a user account associated with a submission of a search query;
    identify a network page requested with the user account;
    store the submission of the search query in a plurality of previous submissions of the search query;
    determine that the network page has a ranking that is higher than a first threshold that represents a measure of relevancy of the network page compared to another network page and a measure of popularity of the network page compared to another network page;
    in response to a determination that the network page is ranked higher than the first threshold, calculate a percentage of the plurality of previous submissions of the search query that are associated with a request for the network page;
    determine that the calculated percentage exceeds a second threshold that represents a probability that the network page will be visited by a user associated with the user account after the submission of the search query; and
    in response to a determination that the calculated percentage exceeds the second threshold, assign the search query to at least one of a plurality of search query categories.

2. The non-transitory computer-readable medium of claim 1, wherein the network page is requested subsequent to the submission of the search query.

3. The non-transitory computer-readable medium of claim 1, wherein the plurality of search query categories comprise a non-product search query category and a product search query category.

4. A system, comprising:
    a computing device comprising a processor and a memory; and
    machine readable instructions stored in the memory that, when executed by the processor, cause the computing device to at least:
        identify a user account associated with a submission of a search query to an electronic commerce application;
        identify a network page provided by the electronic commerce application, wherein the network page is requested in association with the user account;
        calculate a percentage of a plurality of previous submissions of the search query that are associated with a request for the network page;
        determine that the calculated percentage exceeds a threshold that represents a probability that the network page will be visited by a user associated with the user account after the submission of the search query; and in response to a determination that the calculated percentage exceeds the threshold, assign the search query to at least one of a plurality of search query categories.

5. The system of claim 4, wherein the plurality of search query categories comprises at least one of a default search query category, a page specific search query category, or a topic specific search query category.

6. The system of claim 4, wherein the machine readable instructions that cause the computing device to assign the search query to the at least one of the plurality of search query categories further cause the computing device to at least reclassify the search query from another one of the plurality of search query categories to the at least one of the plurality of search query categories.

7. The system of claim 4, wherein the network page comprises a customer service network page provided by an electronic commerce application or a product network page provided by the electronic commerce application.

8. The system of claim 4, wherein:
the network page corresponds to a unique identifier;
the machine readable instructions, when executed by the processor, further cause the computing device to at least identify a search query category associated with the unique identifier; and
the machine readable instructions that cause the computing device to assign the search query to at least one of the plurality of search query categories further cause the computing device to at least assign the search query based at least in part on the search query category associated with the unique identifier corresponding to the network page.

9. The system of claim 8, wherein the unique identifier corresponds to an item identifier for an item within a product catalog accessible via an electronic commerce application.

10. The system of claim 4, wherein:
the machine readable instructions, when executed by the processor, further cause the computing device to at least:
identify a ranking of the requested network page; and
determine that the ranking of the requested network page exceeds a predefined threshold; and
the machine readable instructions that cause the computing device to assign the search query to at least one of the plurality of search query categories further cause the computing device to at least assign the search query based at least in part on a classification of the requested network page in response to a determination that the ranking of the requested network pages exceeds the predefined threshold.

11. The system of claim 4, wherein the machine readable instructions, when executed by the processor, further cause the computing device to at least:
calculate a probability that the search query submitted with the user account would result in a subsequent request for the network page with the user account;
calculate a ratio representing a number of times the search query is submitted that results in the subsequent request for the network page divided by a total number of submissions of the search query; and
associate the search query with the requested network page in response to a determination that the calculated probability is less than the calculated ratio.

12. The system of claim 4, wherein the network page is requested subsequent to the submission of the search query.

13. A method, comprising:
identifying, via a computing device, a user account associated with a submission of a search query to an electronic commerce application;
identifying, via the computing device, a network page provided by the electronic commerce application, wherein the network page is requested in association with the user account;
calculating, via the computing device, a percentage of a plurality of previous submissions of the search query that are associated with a request for the network page;
determining, via the computing device, that the calculated percentage exceeds a threshold that represents a probability that the network page will be visited by a user associated with the user account after the submission of the search query; and
assigning, via the computing device, the search query to at least one of a plurality of search query categories in response to a determination that the calculated percentage exceeds the threshold.

14. The method of claim 13, wherein the plurality of search query categories comprises at least one of a default search query category, a page specific search query category, or a topic specific search query category.

15. The method of claim 13, wherein assigning the search query to the at least one of the plurality of search query categories further comprises reclassifying, via the computing device, the search query from another one of the plurality of search query categories to the at least one of the plurality of search query categories.

16. The method of claim 13, wherein the network page comprises a customer service network page provided by an electronic commerce application or a product network page provided by the electronic commerce application.

17. The method of claim 13, wherein:
the network page corresponds to a unique identifier;
the method further comprises identifying, via the computing device, a search query category associated with the unique identifier; and
assigning the search query to at least one of the plurality of search query categories further comprises assigning, via the computing device, the search query based at least in part on the search query category associated with the unique identifier corresponding to the network page.

18. The method of claim 17, wherein the unique identifier corresponds to an item identifier for an item within a product catalog accessible via an electronic commerce application.

19. The method of claim 13, further comprising
identifying, via the computing device a ranking of the requested network page;
determining, via the computing device, that the ranking of the requested network page exceeds a predefined threshold; and
wherein assigning, via the computing device, the search query to at least one of the plurality of search query categories further comprises assigning the search query based at least in part on a classification of the requested network page in response to a determination that the ranking of the requested network pages exceeds the predefined threshold.

20. The method of claim 13, further comprising:

calculating, via the computing device, a probability that the search query submitted with the user account would result in a subsequent request for the network page with the user account;

calculating, via the computing device, a ratio representing a number of times the search query is submitted that results in the subsequent request for the network page divided by a total number of submissions of the search query; and associating, via the computing device, the search query with the requested network page in response to a determination that the calculated probability is less than the calculated ratio.

* * * * *